No. 871,250. PATENTED NOV. 19, 1907.
L. WIRTH.
APPARATUS FOR PREPARING AND STORING BOILED HAMS.
APPLICATION FILED APR. 18, 1907.
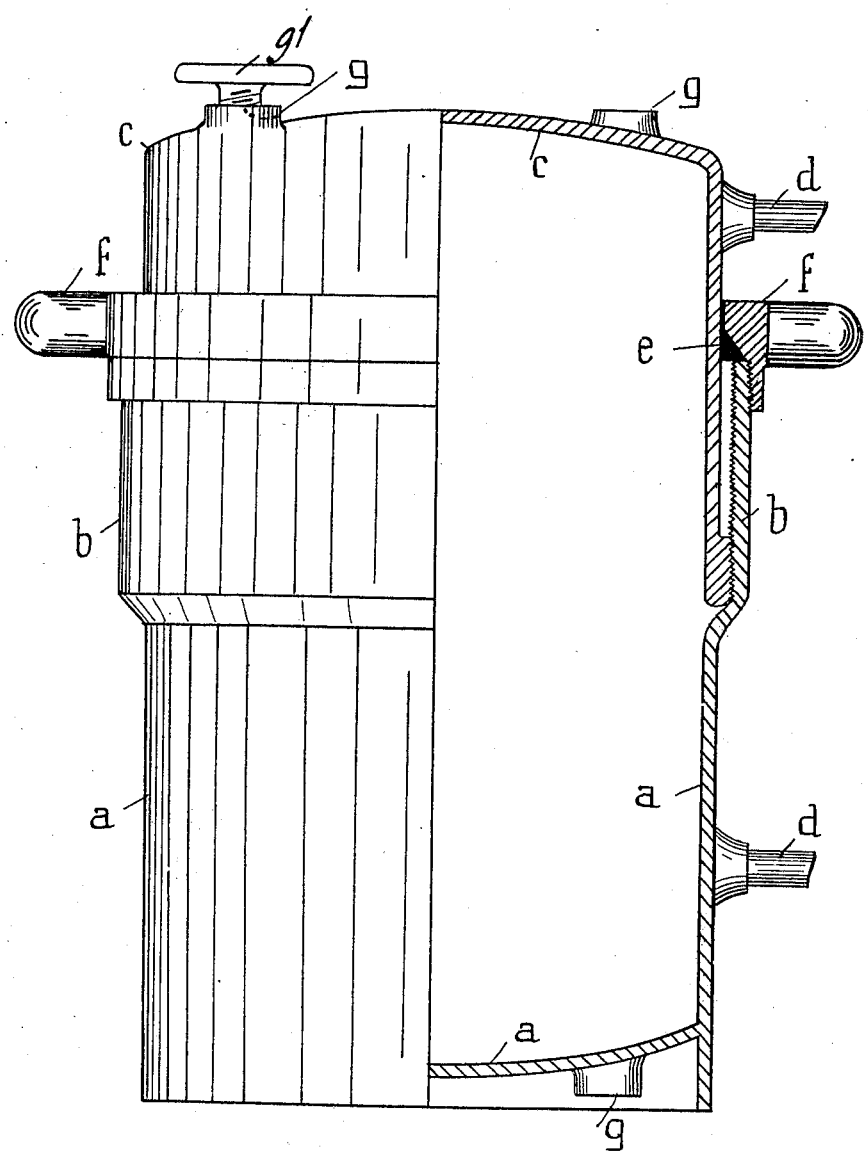
Witnesses
A. J. Haddan
A. Morrill
Inventor
Louis Wirth
by his Attorney R. Haddan

UNITED STATES PATENT OFFICE.

LOUIS WIRTH, OF HANOVER, GERMANY.

APPARATUS FOR PREPARING AND STORING BOILED HAMS.

No. 871,250.  Specification of Letters Patent.  Patented Nov. 19, 1907.

Application filed April 18, 1907. Serial No. 368,945.

*To all whom it may concern:*

Be it known that I, LOUIS WIRTH, butcher, a subject of the German Emperor, residing at Hanover, Germany, have invented Apparatus for Preparing and Storing Boiled Ham and other Meat, of which the following is a specification.

This invention relates to apparatus for preparing and storing boiled ham and other meat.

The method hitherto adopted for preparing ham for sale in slices consists in the first place in removing the ham bone, rolling the ham and tying it with string, and placing it in boiling water, in which it remains for a certain length of time. By this treatment a considerable quantity of juice is removed from the ham, and the latter suffers a loss of weight which may, in the case of a large ham, amount to two or three pounds or more. The flavor of the ham is considerably deteriorated by the loss of juice. The greatest disadvantage of the old method described lies, however, in the fact that the ham cannot be kept beyond a certain length of time without becoming unfit for food, so that the said method does not enable hams to be prepared in large quantities for storage.

The present invention relates to apparatus in which the cooking of the ham is effected without causing appreciable loss of weight and in which the ham remains fresh when cooked and can be stored for an indefinite length of time.

The apparatus is illustrated in the annexed drawing, which is a part elevation part section thereof.

The apparatus comprises a receptacle consisting of an outer member $a$ enlarged and internally screw-threaded at its upper part $b$, and an inner member $c$ provided at its lower open end with an externally screw-threaded flange to engage the screw-threaded part $b$. The top and bottom of the receptacle are preferably oval, or of such other shape as to adapt the receptacle to the form into which ham is usually pressed; it is, therefore, unnecessary to bind the ham with string. Handles $d$ are fixed to the outer and inner members to facilitate the screwing thereof together. An air-tight joint is made by means of a packing ring $e$ of suitable material, for example soft metal having contact with the smooth wall of the member $c$ and with the upper edge of the screw-threaded part $b$ of member $a$ and tightened by means of a screw-threaded ring $f$ with a beveled interior face.

A plurality of orifices $g$ provided in the top or wall of the one or both members and adapted to be closed by means of screw-stoppers $g^1$ allow air to escape from the receptacle when the inner member $e$ is screwed in to close the receptacle and compress the ham.

When the ham has been prepared for cooking it is placed in the receptacle, and the screwing together of the members $a$ and $c$ causes the ham to be compressed and air to be expelled, the said air passing through the orifices $g$. When these orifices have been closed and the ring $f$ has been screwed on, the ham packed in the receptacle is placed in water and boiled.

When cooked, the ham remains perfectly fresh and fit for food in the receptacle, and also retains its flavor and juiciness, since the loss of fat, juice and the like is prevented during the cooking process. The loss of weight is practically nil.

The improved apparatus can also be used for other meat similarly prepared, for example smoked meat, the cooking receptacle serving as the package wherein the meat is stored or conveyed, for example to tropical countries.

What I claim as my invention and desire to secure by Letters Patent of the United States is:—

Apparatus for the purpose set forth comprising a receptacle consisting of an outer member, screw-threaded on the interior thereof, an inner member having at its open end an externally screw-threaded flange on the exterior thereof adapted to engage the interior screw-threads of the inner member, said members being provided with apertures for the discharge of air from the interior of the receptacle, means for closing said apertures, a packing ring having contact with the external face of the inner member and with the edge of the outer member and a screw-threaded ring engaging external threads on the outer member for holding said packing in place, substantially as described.

In witness whereof I have signed this specification in the presence of two witnesses.

LOUIS WIRTH.

Witnesses:
  PAUL P. THOMPSON,
  ROBERT V. BÜLOW.